W. O. LUM.
CONTROL SYSTEM.
APPLICATION FILED OCT. 6, 1915.
1,286,040.
Patented Nov. 26, 1918.
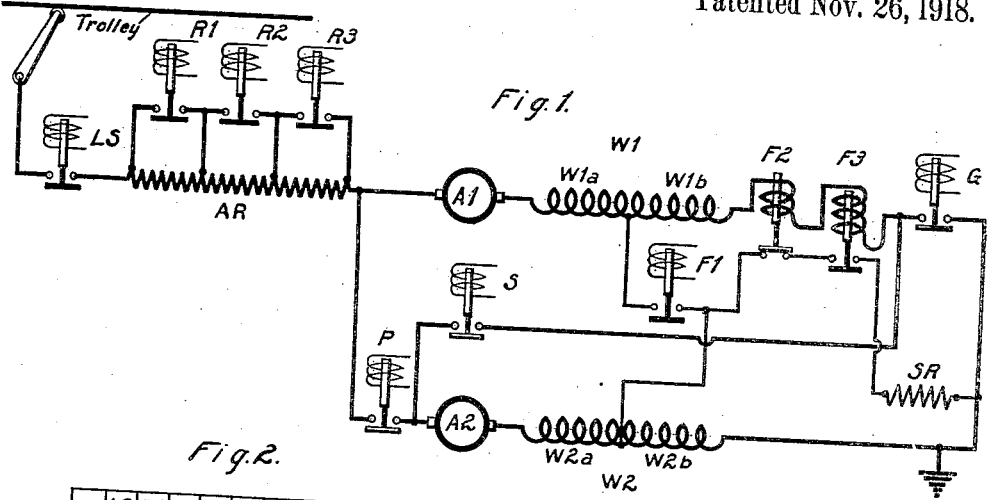
*Fig. 1.*
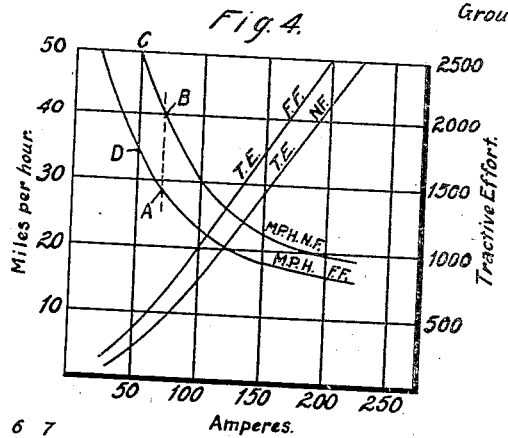
*Fig. 2.* *Fig. 4.*
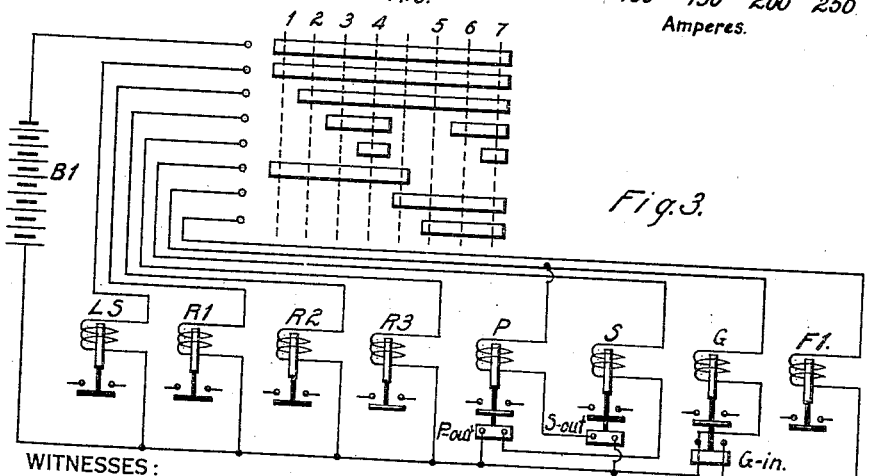
*Fig. 3.*
WITNESSES:
R. J. Fitzgerald
W. R. Coley
INVENTOR
Walter O. Lum.
BY
Wesley K. Carr
ATTORNEY

UNITED STATES PATENT OFFICE.

WALTER O. LUM, OF WILKINSBURG, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,286,040.   Specification of Letters Patent.   Patented Nov. 26, 1918.

Application filed October 6, 1915. Serial No. 54,345.

*To all whom it may concern:*

Be it known that I, WALTER O. LUM, a citizen of the United States, and a resident of Wilkinsburg, in the county of Allegheny and State of Pennsylvania, have invented a new and useful Improvement in Control Systems, of which the following is a specification.

My invention relates to systems of control, and it has special reference to the automatic auxiliary emergency control of electric railway vehicle motors and the like.

One object of my invention is to provide a system of the above-indicated character which shall be relatively simple and inexpensive in construction and effective and reliable in operation, and which shall automatically prevent the vehicle motors from attaining a dangerously high speed, by reason of the vehicle traveling down hill, for example.

Another object of my invention is to provide a system of the class referred to whereby, in case of relatively heavy-load conditions, such as hill-climbing, with "normal field" motor connections, the field strength will be automatically increased to improve commutating conditions, if necessary.

According to my present invention, I provide an electric vehicle motor having an armature and a series-connected field magnet winding, a switching device for excluding a portion of the motor field winding from circuit at the end of the accelerating period to produce a further increase of speed, in accordance with well known principles, and a second switching device for restoring the full field excitation to the motor under conditions of abnormally high motor speed to automatically reduce the speed to a normal value.

In the accompanying drawing, Figure 1 is a diagrammatic view of the main circuits of a system of control embodying my invention; Fig. 2 is a sequence chart, of well known form for indicating the sequence of operation of the various switches that are illustrated in Fig. 1; Fig. 3 is an auxiliary governing system of a familiar type for manipulating the various switches in accordance with the sequence chart of Fig. 2; and Fig. 4 is a chart of characteristic motor curves for indicating the automatic emergency operation of my invention.

Referring to Fig. 1 of the drawing, the system shown comprises a plurality of suitable supply-circuit conductors respectively marked Trolley and Ground; a plurality of electric motors respectively having armatures A1 and A2 and series-connected subdivided field-magnet windings W1 and W2; an accelerating resistor AR, the sections of which are respectively adapted to be short-circuited by switches R1, R2 and R3; a plurality of main-circuit switches LS, S, P, G and F1; a plurality of switching devices or limit switches F2 and F3 having their actuating coils connected in series relation with the motor having the armature A1; and an auxiliary shunting resistor SR that is adapted to be employed in connection with the "field control" of the motors.

The field winding W1 is divided into two sections W1a and W1b, and the other field winding W2 is similarly divided into portions W2a W2b. The sections W1b and W2b are adapted to be connected in mutual parallel relation to the shunting resistor SR at the end of the motor-accelerating period, as set forth more fully later. The accelerating resistor AR is connected in common series-circuit relation with the two electric motors. The switch F1, when closed, is adapted to directly connect the intermediate junction-points of the field-winding sections, while the simultaneous closure of the switch F1 and the switching devices F2 and F3 effects the connection of the shunting resistor across the field-winding sections W1b and W2b. The switching device F2 is adapted to drop to its lower or closed position under conditions of relatively high motor speed and accompanying relatively low motor current, while the switching device F3 is adapted to drop to its lower or open position under conditions of still higher and dangerous motor speed and simultaneous still lower motor current, for a purpose to be set forth.

Referring to Fig. 3, the auxiliary governing system shown is a representative and well-known system comprising the actuating coils of the several motor-controlling switches that are shown in Fig. 1, together with suitable electrically interlocking contact members therefor; a master controller MC that is adapted to occupy a plurality of operative positions 1 to 7, inclusive; and a battery B1 for energizing the various switch-actuating coils through the master controller. For the sake of simplicity and clearness, the customarily employed master reverser has been omitted from Fig. 3, and the corresponding main circuit reversing switch has been omitted from Fig. 1; however, it will be understood that the switching devices mentioned are normally employed in connection with my invention. Inasmuch as the particular auxiliary governing system that is employed is immaterial to my present invention, I do not deem it necessary to describe, in detail, the various auxiliary circuits that are completed by the manipulation of the master controller, but will confine the description of my invention chiefly to the main circuit connections that are made through the agency of the master controller.

Assuming that the master controller is moved to its initial operative position 1, the switches LS and S are closed, while the current traversing the actuating coil of the switching device F3 serves to maintain the device in its upper or closed position.

Upon actuation of the master controller through positions 2, 3 and 4, the switches R1, R2 and R3 are respectively closed to gradually short circuit the accelerating resistor AR and effect the partial acceleration of the motors. In the next or transition position, the switches R2 and R3 are opened, while the switch G is closed, and, in the initial parallel position 5, the switch P is closed just after the opening of the switch S, the simultaneous closure of the two switches P and S being prevented, in a well-known manner, by the use of interlocks P—out and S—out. Upon the closure of switch G, the actuating coil of the switch F1 is energized through interlock G—in, and the intermediate junction points of the field windings W1 and W2 are thus connected to more nearly preserve an exact balancing of the load between the two motors.

In positions 6 and 7 of the master controller, the switches R2 and R3 are again closed to further increase the operating speed of the motor.

When the motor current has subsequently decreased to the predetermined value for which the switching device F2 is set, the device drops to its lower position, as indicated by the legend FC in the sequence chart of Fig. 2, to connect the shunting resistor SR in mutual parallel relation to the field winding sections W1b and W2b, the switching device F3 being closed at this time also. In this way, the motor speed is further increased, as will be understood.

Assuming that, by reason of the vehicle coasting down a hill, for example, the motor speed approaches a dangerously high value, accompanied by a relatively low motor current, the switching device F3 will drop to its lower or open position, whereby the full field windings W1 and W2 are again made active, and the motor speeds are immediately reduced to a normal and safe value.

The operation just recited is clearly shown by the well-known curve chart of Fig. 4:

Assuming that the motors initially operate in accordance with the curve marked M. P. H. F. F., meaning miles per hour "full field", the acceleration of each motor occurs in accordance with the right-hand portion of the curve until, for example, the point A is reached, which corresponds to position 7 of the master controller. Upon the closure of the switching device F2, the exclusion from circuit of the field-winding sections W1b and W2b causes the motors to operate in accordance with the curve labeled M. P. H. N. F., meaning miles per hour "normal field", so that the speed of the motors corresponds to the point B of the curve or, in the case assumed, a change from about 28 to 40 miles per hour is effected.

If, subsequently, the motor speed approaches a dangerously high value, say 50 miles per hour, as indicated by the point C of the curve marked M. P. H. N. F., then the decreased motor current will permit the switching device F3 to drop to its open position and remove the shunting circuit around the field-winding sections W1b and W2b, whereby the motor speed is immediately reduced to a value corresponding to the point D of the curve labeled M. P. H. F. F., or, in the case illustrated, a reduction in speed from about 50 to 35 miles per hour takes place.

In this way, upon the approach of a dangerously high speed by the vehicle motors, the switching device F3 automatically acts to immediately effect a reduction of the motor speed to a predetermined safe value.

Moreover, in case the vehicle is traveling up hill, for example, under "normal-field" conditions, and the load is sufficiently heavy to produce poor commutating conditions, in conjunction with the weakened field flux, then the switching device F2 is raised to its upper or open position to automatically restore "full-field" conditions, whereby commutating conditions are improved, and a smaller armature current is required to secure the necessary torque.

I do not wish to be restricted to the specific control circuits or arrangement of parts herein set forth, as various modifications thereof may be made without departing from the spirit and scope of my invention. I desire, therefore, that only such limitations shall be imposed as are indicated in the appended claims.

I claim as my invention:

1. In a system of control, the combination with a motor having an armature and a field-magnet winding, of an auxiliary circuit and two electro-responsive devices having energizing coils in circuit with said motor, one of said electro-responsive devices being adapted to connect said auxiliary circuit in shunt to a portion of said field winding and the second electro-responsive device being adapted to break said shunt circuit under predetermined conditions.

2. In a system of control, the combination with a dynamo-electric machine having an armature and a field-magnet winding, of means governed by the current flowing through said machine for shunting a portion of said field-magnet winding when the machine is operated at normal speed, and a second means governed by the current flowing through the machine for removing said shunt circuit when the machine is operated above normal speed.

3. In a system of control, the combination with a dynamo-electric machine having an armature and a field-magnet winding, of an auxiliary circuit, means dependent upon the current flowing through said dynamo-electric machine for connecting said circuit in shunt to a portion of the field-magnet winding, and means for removing said shunt circuit in case the machine speed be raised above a predetermined value.

4. In a system of control, the combination with a dynamo-electric machine having an armature and a field-magnet winding, of an auxiliary circuit, means for connecting said circuit in shunt to a portion of said field winding when the machine is operated at a predetermined speed, and means controlled by the current flowing through said machine for removing the shunt circuit when the speed of the machine is raised to a second predetermined value.

5. In a system of control, the combination with a dynamo-electric machine having an armature and a field-magnet winding, of means for establishing a shunt circuit to divert a portion of the field current to vary the machine speed, and means dependent upon subsequent abnormal speed conditions for opening the shunt circuit to restore the machine speed to a normal value.

6. In a system of control, the combination with a dynamo-electric machine having an armature and a field-magnet winding, of electro-responsive means for normally shunting a portion of said field winding to vary the machine speed, and independent means dependent upon overspeed conditions for removing the shunt circuit to restore the machine speed to a predetermined safe value.

7. In a system of control, the combination with an electric motor having an armature and a series-connected field-magnet winding, of means for normally shunting a portion of said field winding to effect a predetermined increase in the acceleration of the motor, and independent means dependent upon overspeed conditions for removing the shunt circuit to reduce the motor speed to a predetermined safe value.

8. A control system comprising an electric motor having an armature and a series-connected field-magnet winding, an accelerating resistor, means for varying said resistor to partially accelerate the motor, means for shunting a portion of said field winding to complete the motor acceleration, and electro-responsive means dependent upon overspeed conditions for removing the shunt circuit to reduce the motor speed to a predetermined safe value corresponding to "full-field" motor operation.

9. In a system of control, the combination with an electric motor having an armature and a series-connected field-magnet winding, of a plurality of switching devices severally having actuating coils connected in series relation with said motor, means including contact members of both said switching devices for normally shunting a portion of said field winding under conditions of relatively high speed and relatively low current, and means for interrupting said shunt circuit under abnormal conditions of still higher speed and lower current to reduce the motor speed to a safe value corresponding to "full-field" motor operation.

10. In a system of control, the combination with an electric motor having an armature and a series-connected field-magnet winding, of electro-responsive means for normally establishing a circuit around a portion of said field winding to effect a predetermined increase in the acceleration of the motor, and means dependent upon subsequent relatively heavy-load conditions for removing the shunt circuit to improve commutating conditions in the motor.

In testimony whereof, I have hereunto subscribed my name this 29th day of Sept., 1915.

WALTER O. LUM.